(12) United States Patent
Popat (10) Patent No.: US 6,374,313 B1
(45) Date of Patent: *Apr. 16, 2002

(54) FIFO AND METHOD OF OPERATING SAME WHICH INHIBITS OUTPUT TRANSITIONS WHEN THE LAST CELL IS READ OR WHEN THE FIFO IS ERASED

(75) Inventor: Kaushik Popat, Pleasanton, CA (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/315,792

(22) Filed: Sep. 30, 1994

(51) Int. Cl.[7] ................................................ G06F 12/00
(52) U.S. Cl. ........................ 710/52; 710/57; 711/219; 365/189.01; 365/189.04; 365/189.05; 365/78; 365/221
(58) Field of Search .................... 395/421.09, 250; 365/189.07, 227, 189.01, 189.04, 221, 78, 189.05; 364/707; 711/219; 710/52, 53, 56, 57

(56) References Cited

U.S. PATENT DOCUMENTS

| | | | | |
|---|---|---|---|---|
| 4,459,681 A | * | 7/1984 | Ohtsuka | 365/78 |
| 4,833,651 A | * | 5/1989 | Seltzer et al. | 365/189.07 |
| 4,864,543 A | * | 9/1989 | Ward et al. | 365/221 |
| 4,891,788 A | * | 1/1990 | Kreifels | 365/49 |
| 4,910,731 A | * | 3/1990 | Sakurai et al. | 370/413 |
| 4,949,301 A | * | 8/1990 | Joshi et al. | 711/100 |
| 5,133,062 A | * | 7/1992 | Joshi et al. | 703/13 |
| 5,381,126 A | * | 1/1995 | McClure | 340/146.2 |
| 5,426,612 A | * | 6/1995 | Ichige | 365/220 |
| 5,426,756 A | * | 6/1995 | Shyi et al. | 711/159 |
| 5,444,853 A | * | 8/1995 | Lentz | 711/123 |
| 5,471,583 A | * | 11/1995 | Au et al. | 710/57 |
| 5,502,655 A | * | 3/1996 | McClure | 702/127 |
| 5,506,809 A | * | 4/1996 | Csoppenszky et al. | 365/221 |

* cited by examiner

Primary Examiner—Hong Kim
(74) Attorney, Agent, or Firm—Steven Lin (57) ABSTRACT

A FIFO is operated so no changes occur on an output thereof in response to (1) only one stage of the FIFO having a signal stored therein when a read command is supplied to the FIFO exclusively of a write command and/or (2) the FIFO being flushed, i.e., erased. Result (1) is achieved by decrementing a write pointer by one without changing a read pointer or by loading the write pointer with the contents of the read pointer. Result (2) is achieved by loading the write pointer with the contents of the read pointer.

6 Claims, 6 Drawing Sheets

FIFO AND METHOD OF OPERATING SAME WHICH INHIBITS OUTPUT TRANSITIONS WHEN THE LAST CELL IS READ OR WHEN THE FIFO IS ERASED

FIELD OF INVENTION

The present invention relates generally to first in first out storage devices (FIFOs) and, more particularly, to a FIFO apparatus and method wherein no changes occur on an output thereof in response to (1) only one stage of the FIFO having a signal stored therein when a read command is supplied to the FIFO exclusively of a write command and/or (2) the FIFO being flushed, i.e., the contents thereof being effectively erased.

BACKGROUND ART

First in first out storage devices (FIFOs) include a signal input, a signal output and multiple (N) stages between the input and output. The stages respond to the input such that a signal supplied first in time to the input is derived first in time at the output. Writing and reading of synchronous FIFOs is in response to an edge of clock pulses. Usually, FIFOs are responsive to multibit words so each of the N storage stages has n bits, where n is equal to the number of bits in a word.

One type of prior art synchronous FIFO uses a shift register structure in which signals propagate through a register bank having storage elements or stages serially connected together. The bits of a first word are shifted into a first element, thence to further elements of the register bank and are derived at the output after N clock pulses have been supplied to the register bank. This type of FIFO does not require complex control and is adequate for relatively low values of N or where the latency of data supplied to the FIFO relative to the data derived at the FIFO output is not important.

Most modern synchronous FIFOs, however, use a random access memory (RAM) structure and control logic employing write and read pointers or enable bits for each word, as well as an entry counter. The write and read pointers route signals from the input to appropriate static memory stages in the RAM, thence to the FIFO output. The signals are supplied to the stages under the control of the write pointer and are coupled from the stages to the output terminal under the control of the read pointer. The entry counter keeps track of the number of stages in the RAM memory having signals stored therein. Control logic of such FIFOs indicates the state of the RAM and where signals are located in the RAM.

In most RAM based FIFOs, reading the last entry from the FIFO advances the FIFO to an empty state, i.e., such that no signals are stored in any of the FIFO stages. In advancing the FIFO to the empty state, redundant signal transitions are derived at the output, usually a data bus having n bits. The redundant transitions are derived because the control logic for the read and write pointers is usually designed such that all write commands advance the write pointer and all read commands advance the read pointer. Hence, the read command which advances the read pointer to render the FIFO empty causes transitions to be derived at the FIFO output. These transitions which occur when the FIFO is being emptied cause a considerable amount of power to be consumed in the FIFO, as well as in components responsive to the FIFO output. This power consumption, which I have realized is unnecessary, has an adverse effect on the length of time a portable device including the FIFO can operate without recharging. A further disadvantage of these transitions is that devices responsive to the FIFO output may not have adequate "hold time" to handle them.

It is, accordingly, an object of the present invention to provide a new and improved FIFO apparatus and method of operating same.

Another object of the invention is to provide a new and improved FIFO and method of operating same such that there is a reduction in power consumed by the FIFO and apparatus responsive to the FIFO output.

A further object of the invention is to provide a new and improved method of and apparatus for reducing the number of signal transitions at the output of a FIFO so there is a reduction in power consumed by the FIFO and circuits responsive to the FIFO output.

THE INVENTION

In accordance with one aspect of the present invention, the foregoing objects are achieved by operating a first in first out computer type device having N storage stages between an input and output and which is responsive to read and write commands for entries to be read from and written into the computer device by controlling the output so no transition occurs thereon in response to only one of the stages of the device having an input stored therein when a read command signal is supplied to the device exclusively of a write command. Thereby, the output remains at the same value it had immediately prior to the read command signal being supplied to the device.

In an embodiment wherein a RAM based FIFO is employed, contents of read and write pointers for entries in the N stages are controlled so the output remains at the same value it had immediately prior to the read command signal being supplied to the device. In a first embodiment, the control includes decrementing the contents of the write pointer by one without changing the contents of the read pointer. In a second embodiment, the control includes loading the write pointer with the contents of the read pointer.

The foregoing objects are also achieved by preventing transitions from occurring at the computer device output when a command for erasing, i.e. flushing, all entries in the device is supplied thereto. In this arrangement, the control also includes loading the write pointer with the contents of the read pointer. By loading the write pointer with the contents of the read pointer, the FIFO output is maintained static.

In accordance with another aspect of the invention, the foregoing objects are achieved by providing a controlled first in-first out register having N register stages for storing digital words, an input bus responsive to input words and an output bus on which are derived output words. A write pointer responsive to a write command controls coupling of words from the input bus to a designated one of the N stages. A read pointer responsive to a read command controls coupling of words from a designated on of the N stages to the output bus. A controller for the write and read pointers causes the first word supplied to the input bus to be the first word supplied to the output bus so that transitions normally occur on the output bus in response to read and write commands. The controller prevents transitions on the output bus in response to (1) only one stage storing a word at the time the read pointer is supplied with a read command without the write pointer being supplied with a write command and (ii) an erase command being simultaneously supplied to both the read and write pointers so both pointers are reset to an empty state.

Preferably, the controller includes a counter responsive to read and write commands for registering the number of stages storing words and the pointers are synchronously activated in response to transitions of a clock source.

The above and still further objects, features and advantages of the present invention will become apparent upon consideration of the following detailed descriptions of specific embodiments thereof, especially when taken in conjunction with the accompanying drawings.

DESCRIPTION OF THE PREFERRED EMBODIMENTS

Figure 1:
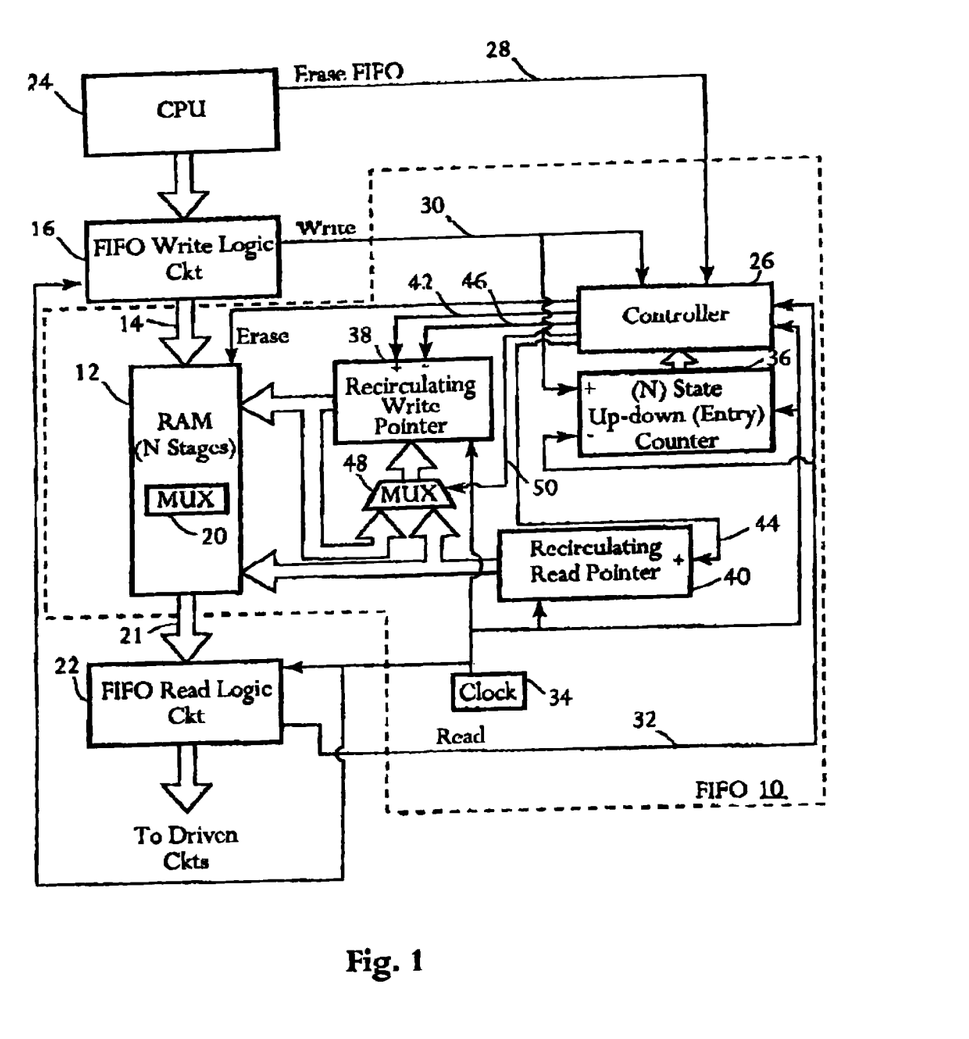
FIG. 1 is a block diagram of RAM based FIFO in accordance with several embodiments of the present invention.

Reference is now made to FIG. 1 of the drawing wherein first in first out computer type storage device (FIFO) 10 is illustrated as including random access memory (RAM) 12 having N stages, each having n bits and n is the number of bits in each of several words stored in the RAM; typically n has a value such as 16 or 32. RAM 12 includes n input terminals responsive to sequential n bit words on bus 14, as derived from FIFO write logic circuit 16. RAM 12 also includes multiplexer 20 which derives an n bit word supplied by n bit bus 21 to FIFO read logic circuit 22, that in turn supplies n bit output words to other driven circuits downstream of FIFO 10.

FIFO write logic circuit 16 is responsive to n bit words sequentially derived from a suitable source, e.g. CPU 24, representing alphanumeric values, as well as control signals. CPU 24 also derives various command and control signals, including an erase, i.e. flush, FIFO signal that is supplied by the CPU to controller 26 of the FIFO via lead 28. Controller 26 also responds to command signals derived from FIFO write logic circuit 16 on lead 30 indicating a write operation is to be performed in RAM 12 and to a signal derived by FIFO read logic circuit 22 on lead 32 indicating a read command signal is to be supplied to RAM 12. Controller 26 is also responsive to periodic clock pulses from clock source 34 and signals from up-down counter 36 having N states which indicate the number of stages in RAM 12 having signals stored therein. Counter 36, typically referred to as an entry counter, includes increment and decrement (up and down) inputs respectively responsive to write and read command signals supplied to leads 30 and 32 by FIFO write logic circuit 16 and FIFO read logic circuit 22.

To control which of the N stages of RAM 12 are sequentially responsive to the sequential words on bus 14, FIFO 10 includes recirculating write pointer 38 having an output bus with $\sqrt{N}$ bits. To control which of the N stages of RAM 12 are to be coupled to logic circuit 22, FIFO 10 includes recirculating read pointer 40, having an output bus with $\sqrt{N}$ bits. Write pointer 38 thus functions as a write address counter to control coupling of signals from bus 14 to a selected stage in RAM 12, while read pointer 40 supplies a signal to the RAM to control which stage in the RAM is to be coupled to circuit 22. Each of write pointer 38 and read pointer 40 includes an increment input responsive to controller 26. The increment inputs of pointers 38 and 40 are operated in the normal manner of the prior art in response to outputs of controller 26 on leads 42 and 44, respectively, except when controller 26 is supplied with an erase FIFO input by CPU 24 on lead 28 and when RAM 12 has only one stage storing a signal and is commanded to read that stage without being commanded to have a signal being written into it. Write and read pointers 38 and 40 are commanded to perform operations in response to an edge of pulses derived from clock 34, as are FIFO write logic circuit 16, FIFO read logic circuit 22 and controller 26.

In accordance with one embodiment of the invention, write pointer 38 is provided with a decrement input which responds to an output of controller 26 on lead 46. In accordance with a further embodiment of the invention, the output bus of read pointer 40 is coupled via multiplexer 48 to an input of recirculating write pointer 38. To this end, multiplexer 48 is normally activated so the contents of pointer 38 are recirculated back to the write pointer via the multiplexer and the contents of pointer 40 are not coupled through the gate. Multiplexer 48 is selectively enabled by an output supplied to it by controller 26 via lead 50 to disable recirculation of the contents of write pointer 38 and cause the contents of read pointer 40 to be loaded into write pointer 38 via the multiplexer.

In accordance with one aspect of the present invention, no transitions are derived on output bus 21 when (1) RAM 12 has a signal stored in only one stage thereof, (2) the RAM is being read and (3) no write command is derived. The foregoing conditions are indicated in the flow diagram of FIG. 2 for the operations of controller 26. During operation 52, controller 26 makes a determination as to whether entry counter has a count of one, indicating that only one stage of RAM 12 is storing a signal. In response to operation 52 indicating the contents of entry counter 36 are equal to one, controller 26 advances to operation 54, during which a determination is made as to whether RAM 12 is being read. In response to operation 54 indicating RAM 12 is being read, a determination is made by controller 26 during operation 56 as to whether RAM 12 is being written.

Operations 54 and 56 are performed in response to the write command and read command signals respectively supplied to leads 30 and 32 by system bus interface 16 and FIFO read logic circuit 22. In response to controller 26 determining during operation 56 that RAM 12 is not being written, the controller supplies a signal to lead 46. Controller 26 then performs operation 58, causing write pointer 38 to be decremented by one; at this time read pointer 40 is neither incremented nor decremented. Thereby, the contents of write pointer and read pointer 40 are the same and no transition occurs at output interface 20 or one output bus 21 or in FIFO read logic circuit 22. The operations of FIG. 2 are exited in response to operations 52, 54 and 56 respectively yielding "no," "no" and "yes" results upon completion of operation 58.

Figure 2:
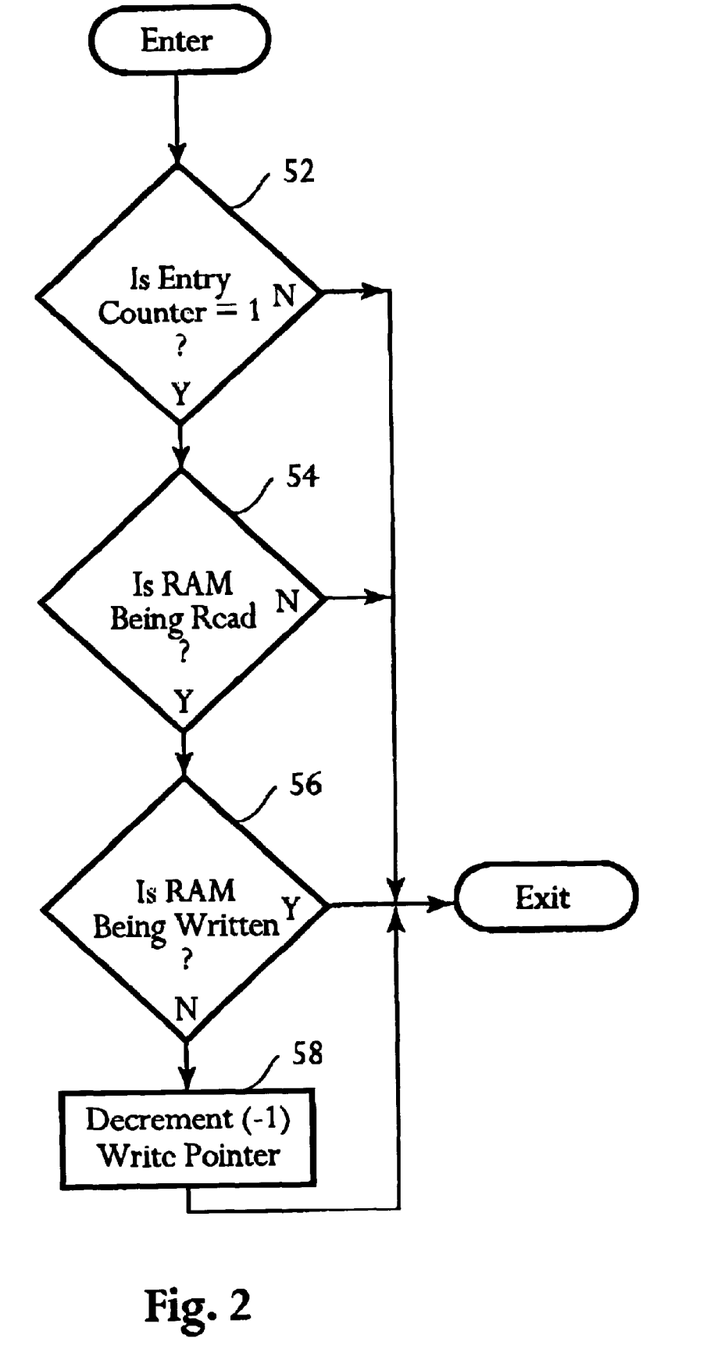
FIG. 2 is a flow diagram of operations performed in the controller of FIG. 1, in accordance with a first embodiment of the invention, wherein a write pointer is decremented by one in response to only one signal being stored in the RAM FIFO while the RAM is being read without being written.
Figure 3:
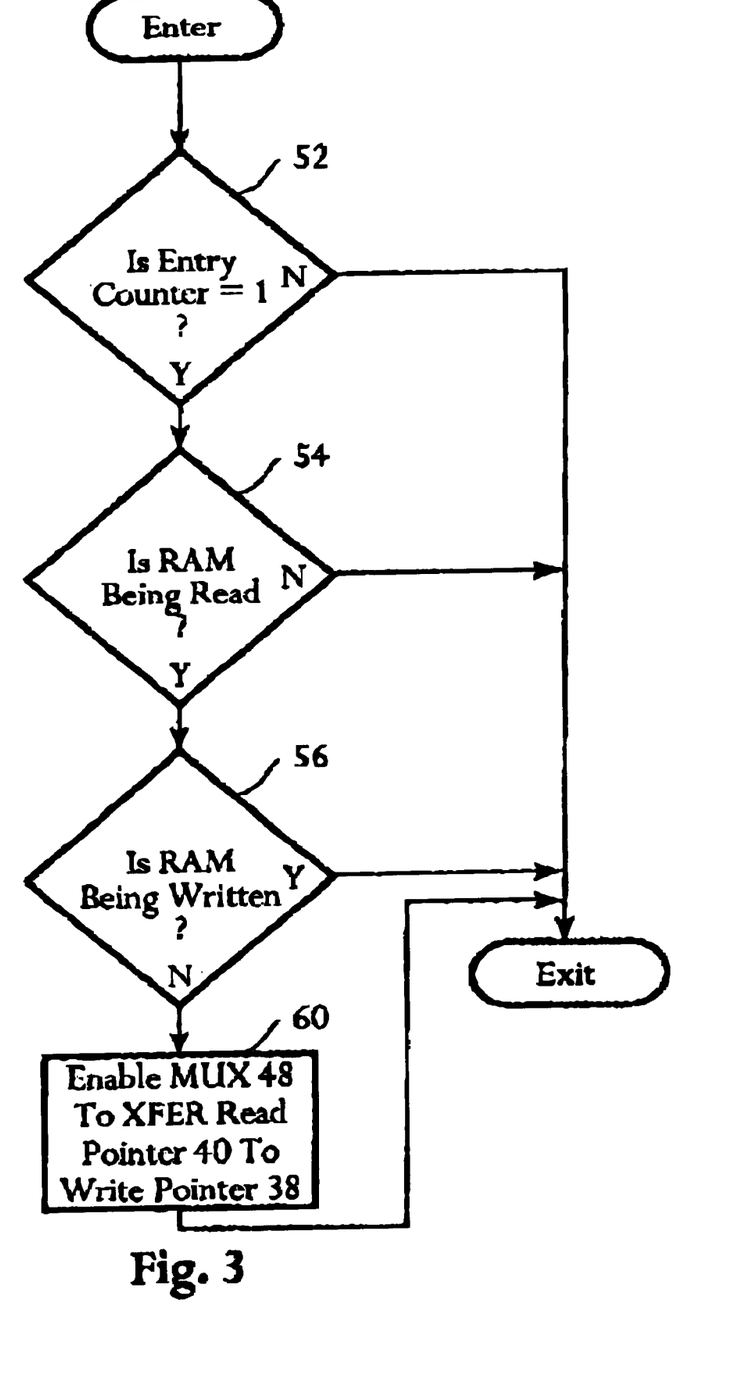
FIG. 3 is a flow diagram of operations performed by the controller of FIG. 1 in accordance with a second embodiment wherein the read pointer contents are transferred to the write pointer in response to only one signal being stored in the RAM FIFO while the RAM is being read without being written.

In accordance with a second embodiment, indicated by the flow diagram of FIG. 3, operations 52, 54 and 56 are performed by controller 26 in the manner described supra in connection with FIG. 2. In response to operation 56 being reached and indicating that RAM 12 is not being written, the program of controller 26 advances to operation 60 at which time the controller supplies a pulse to lead 50, to enable gate 48. With gate 48 enabled, the contents of read pointer 40 are supplied to write pointer 38 and no change is made to the contents of the read pointer. Thereby, the read and write pointers both have the same values stored therein and no transitions occur at output interface 20, output bus 21 or FIFO read logic circuit 22.

Figure 4:
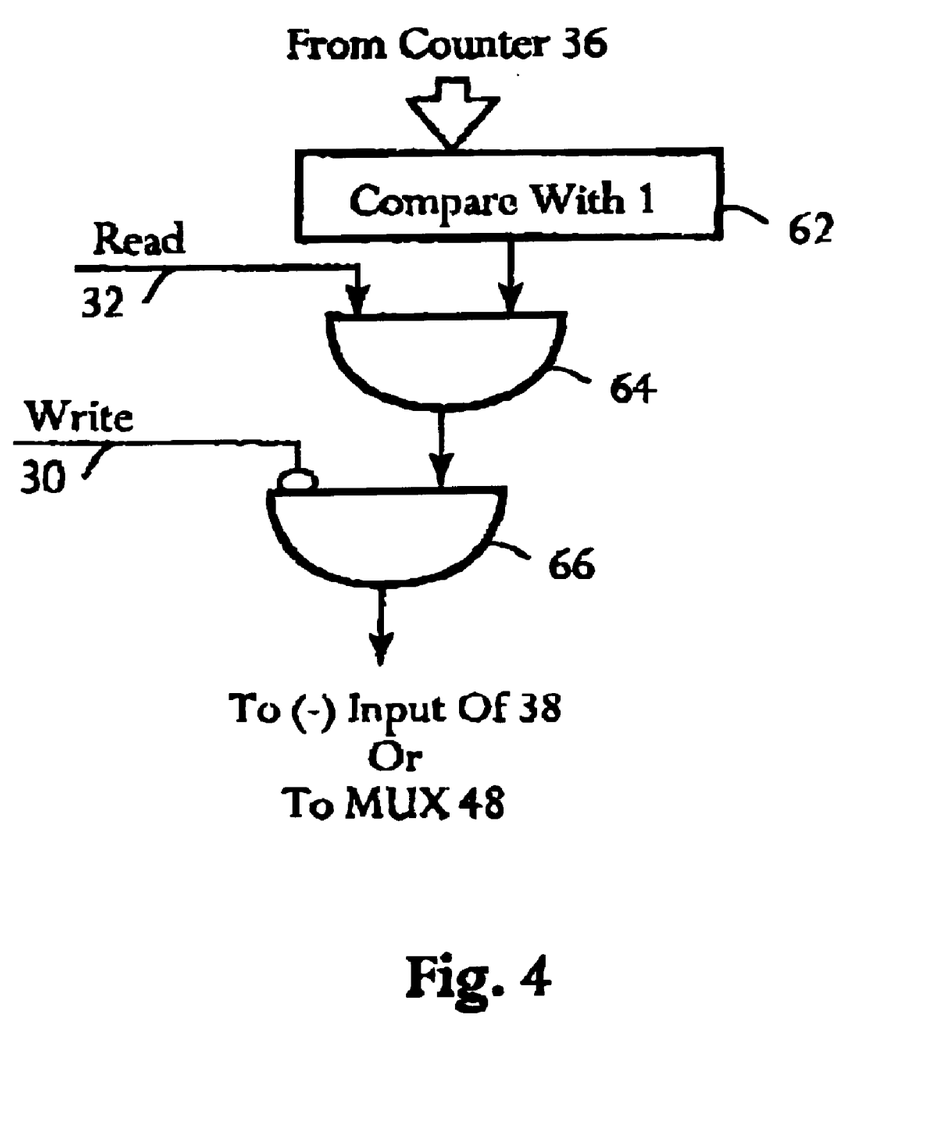
FIG. 4 is a block diagram of control logic included in a controller of FIG. 1 for performing the operations described in connection with FIGS. 2 and 3.

A hard wired apparatus included in controller 26 for performing operations 52, 54 and 56 is illustrated in FIG. 4 as including comparator 62, having an input responsive to the output of counter 36, indicating the number of stages of RAM 12 having signals stored therein. Comparator 62 supplies a binary one signal to AND gate 64, having a second input responsive to the read command signal on lead 32. In response to read command signal being derived on lead 32 simultaneously with the contents of up-down counter 36 having a value of one therein, AND gate 64 supplies a binary one level to a non-inverting input of AND gate 66, having an inverting input responsive to the write signal on lead 30. In response to the write command being derived by system bus interface 16, AND gate 66 is enabled and the binary one output of AND gate 64 is coupled through gate 66. In accordance with one embodiment, the resulting binary one output of gate 66 is coupled via lead 46 to the decrement input of pointer 38. In accordance with a second embodiment, the binary one output of gate 66 is coupled to lead 50 to activate multiplexer 48 to cause the value in read pointer 40 to be supplied to and loaded into write pointer 38. For convenience both of these embodiments are illustrated in FIG. 1, but it is to be understood that only one of these arrangements would be included in an actual device.

Figure 5:
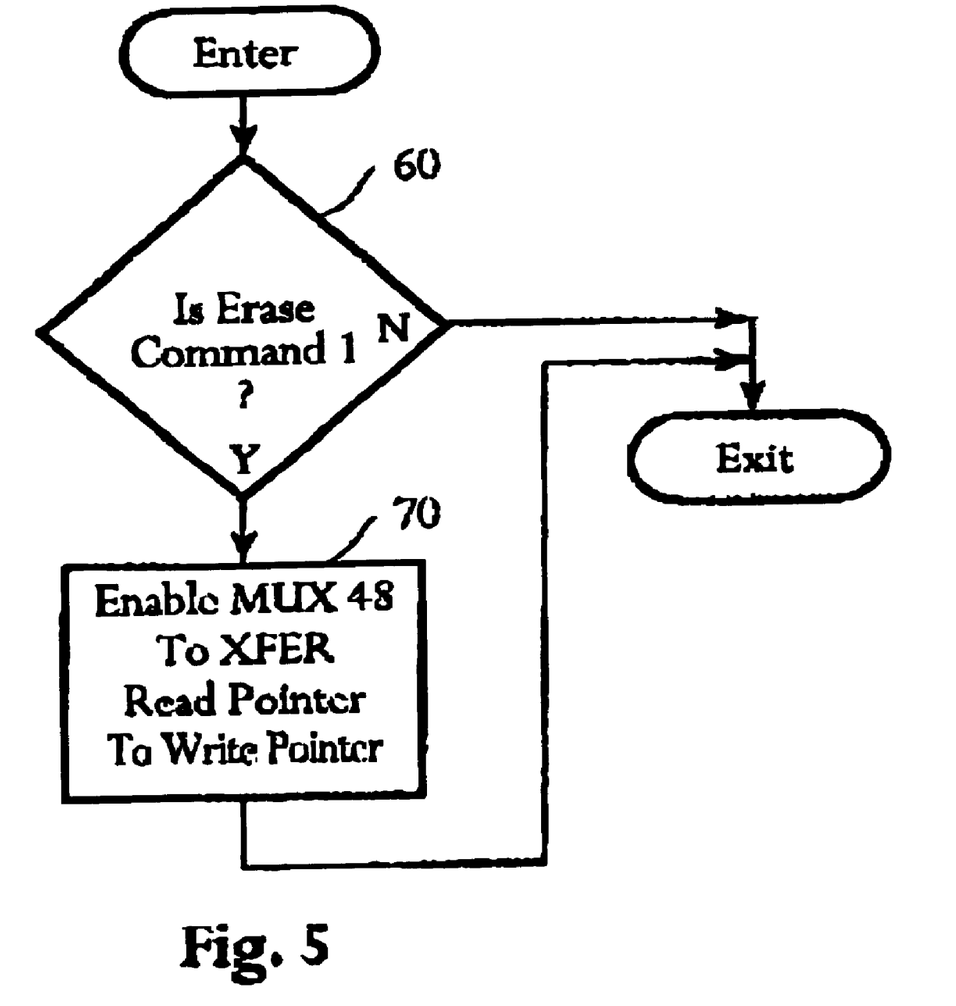
FIG. 5 is a flow diagram of operations performed by the controller of FIG. 1 which causes the contents of a read pointer to be transferred to a write pointer in response to an erase or flush command being supplied to the FIFO by a central processing unit.

In accordance with another aspect of the invention, no transitions are derived at output interface 20 or output bus 21 or FIFO read logic circuit 22 in response to CPU 24 supplying an "erase FIFO" input to controller 26 on lead 28. Controller 26 responds to the erase FIFO signal on lead 28 to perform the operations indicated by the flow diagram of FIG. 5. In particular, controller 26 makes a determination during operation 68 as to whether the erase command signal has been supplied to lead 28. In response to the erase command signal being supplied to lead 28, controller 26 advances to operation 70, during which multiplexer 48 is enabled to transfer the contents of read pointer 40 to write pointer 38. To perform the operations indicated in FIG. 5, controller 26 merely includes a lead for coupling the signal on lead 28 to multiplexer 48. In response to the erase signal being supplied to lead 28 a binary one level is supplied to multiplexer 48, so the contents of read pointer 40 are transferred to write pointer 38, without affecting the contents of the read pointer. Thereby, read and write pointers 38 and 40 both have the same values stored therein and no transitions occur on the outputs of multiplexer 20 or circuit 22.

Figure 6:
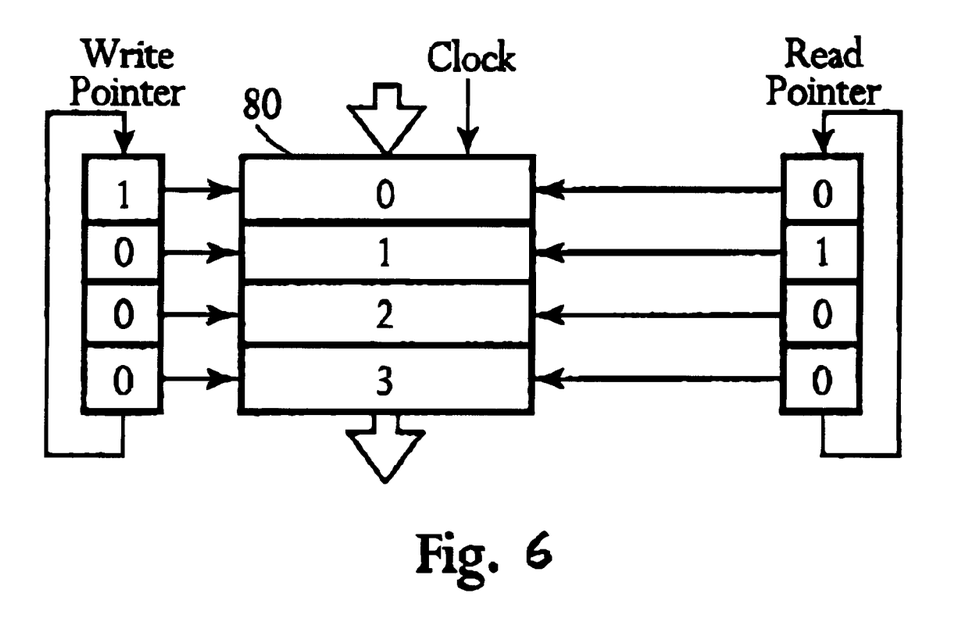
FIG. 6 is a block diagram of a FIFO having a RAM controlled by recirculating shift register write and read pointers, wherein the FIFO includes features of the present invention.

The invention is preferably used with a RAM based FIFO having many stages, as described in connection with FIG. 1. The FIFO illustrated in FIG. 6 includes RAM 80 having M stages, each storing a multibit word, where M is a relatively small integer, such as 4, and a multiplexer. The first stage (stage 0) of RAM 80 is responsive to the bits on bus 14. The output bits of the RAM multiplexer are coupled to output bus 21. Write pointer 82 and read pointer 84, in the form of recirculating shift registers each having M states and stages, keep track of which stages of RAM 80 have signals stored therein. Write and read pointers 82 and 84 are controlled in the same manner described supra in connection with write pointer 38 and read pointer 40 to prevent transitions at the output of RAM 80 when the RAM is being erased and/or when (1) only one stage of RAM 80 is storing a word, (2) a read command is derived, and (3) no write command is derived.

Because of the reduction in the number of transitions on output bus 21 and at the output of FIFO read logic circuit 22, there is a reduction in power consumed by the FIFO in the embodiments of FIGS. 1 and 7. In addition, and perhaps more importantly, there is a reduction in power in the devices driven by output bus 21 and which are downstream of the FIFOs. These reductions are significant because there are 16 or 32 bits associated with output bus 21 and the circuits driven by it.

While there have been described and illustrated specific embodiments of the invention, it will be clear that variations in the details of the embodiments specifically illustrated and described may be made without departing from the true spirit and scope of the invention as defined in the appended claims.

What is claimed is:

1. A method of operating a first in-first out computer device having N storage stages capable of storing N entries between an input and output, the computer device responding to read and write commands for entries to be read from and written into the computer device, the method comprising the step of:

controlling the output so no transition occurs thereon after a last one of said stages having an unread value stored therein is read when a read command is supplied to the device without a write command being supplied to the device wherein contents of a read pointer and a write pointer for reading and writing respective entries in the N stages are controlled so the value of the write pointer is decremented to equal the value of the read pointer.

2. The method of claim 1 wherein the contents are controlled by decrementing the contents of the write pointer by one without changing the contents of the read pointer.

3. The method of claim 1 wherein the step of controlling the output includes loading the write pointer with the value of the read pointer.

4. A method of operating a first in-first out computer device having N storage stages, a read pointer storing a read pointer value, and a write pointer storing a write pointer value, and an entry counter storing a number of entries in the storage stages, the method comprising:

coupling an input bus to a first of the N storage stages corresponding to the write pointer value;

coupling an output bus to a second of the N storage stages corresponding to the read pointer value;

writing an input value to the first of the N storage stages in response to a write command;

incrementing the write pointer value in response to a write command; and setting the write pointer value to equal the stored read pointer value after reading a last unread value in response to reception of a read command if the read command is received without a corresponding reception of the write command, the setting step comprising maintaining the coupling of the output bus to said second of the N storage elements after execution of the read command and decrementing the write pointer value to equal the stored read pointer value.

5. A method of operating a first in-first out computer device having N storage stages, a read pointer storing a read pointer value, and a write pointer storing a write pointer value, and an entry counter storing a number of entries in the storage stages, the method comprising:

coupling an input bus to a first of the N storage stages corresponding to the write pointer value;

coupling an output bus to a second of the N storage stages corresponding to the read pointer value;

writing an input value to the first of the N storage stages in response to a write command;

incrementing the write pointer value in response to a write command; and setting the write pointer value to equal the stored read pointer value after reading a last unread value in response to reception of a read command if the read command is received without a corresponding reception of the write command, the setting step comprising maintaining the coupling of the output bus to said second of the N storage elements after execution of the read command and loading the stored read pointer value into the write pointer.

6. A first in-first out register comprising:

an input bus;

an output bus;

a memory having N register stages;

a write pointer storing a write pointer value and controlling coupling of signals on the input bus to a first of the memory stages, the write pointer adjusting the write pointer value in response to a first control signal;

a read pointer storing a read pointer value and controlling coupling of signals from a second of the memory stages onto the output bus, the read pointer adjusting the read pointer value in response to a second control signal;

an entry counter storing a number of entries in the memory;

a controller selectively outputting the first and second control signals in response to reception of read and write signals, respectively, the controller changing the write pointer value to equal the read pointer value after execution of a first read signal if the number of entries equals one and a corresponding write signal is not received during reception of said first read signal; and a multiplexer selectively outputting the read pointer value to the write pointer as a changed write pointer value in response to a selection signal from the controller; and wherein the memory maintains the coupling of said signals from said second of the memory stages onto the output bus during the changing of the write pointer value to equal the read pointer value.

* * * * *